UNITED STATES PATENT OFFICE.

EDGAR ROUSE SUTCLIFFE, OF LEIGH, ENGLAND.

TREATMENT OF METAL SCRAP.

1,291,672. Specification of Letters Patent. Patented Jan. 14, 1919.

No Drawing. Application filed March 1, 1917. Serial No. 151,723.

*To all whom it may concern:*

Be it known that I, EDGAR ROUSE SUTCLIFFE, a subject of the King of Great Britain and Ireland, residing at Leigh, Lancashire, England, have invented certain new and useful Improvements Relating to the Treatment of Metal Scrap, of which the following is a specification.

This invention relates to the treatment of metal scrap such as shavings, borings, turnings, sawdust and the like and has for its object to melt down the metal with less loss and with greater convenience than with the usual methods employed.

The invention is applicable generally to melting down scrap metal and it is of special utility in the treatment of the scrap of brass or copper alloys.

According to the invention the metal scrap is intimately mixed with a suitable flux and in such manner that the particles of metal are covered with the flux. The scrap is then briqueted under heavy pressure whereby briquets are produced which may be melted down in any suitable furnace and the metal run into ingots, bars or castings as may be required.

In carrying the invention into effect the metal scrap in the form of shavings, borings, turnings or sawdust is mixed wet in a suitable type of edge runner mixing mill or any type of mixing mill by which the particles of metal are rubbed together and at the same time mixed with one, two or three per cent. of a suitable flux such as borax, soda or potash. Good results have been obtained with three per cent. of ordinary common borax, one or two per cent. of water being added. By this intimate mixture and rubbing of the particles of metal together they become coated with the flux. The material thus treated is then briqueted in any suitable briqueting press under heavy pressure. Ten tons per square inch have given satisfactory results in the production of a dense briquet closely approximating in density to lump scrap. These briquets are then melted down in any suitable furnace and ingots, bars or castings formed therefrom as may be required.

I claim:—

1. A method for the treatment of metal scrap such as shavings, borings, turnings, sawdust and the like, consisting in that the scrap is intimately mixed wet with a flux in the condition of a solid, and that the particles of metal are rubbed together and at the same time covered by the flux, and then briqueting the metal scrap so treated under heavy pressure without any addition thereto, substantially as described.

2. A method for the treatment of metal scrap such as shavings, borings, turnings, sawdust and the like, consisting in intimately mixing the scrap with a flux in the condition of a solid to which a small quantity of water is added, so that the particles of metal are rubbed together and at the same time covered by the flux, and then briqueting the metal scrap so treated under heavy pressure without any addition thereto, substantially as described.

EDGAR ROUSE SUTCLIFFE.